United States Patent
Yukawa et al.

(10) Patent No.: US 6,936,292 B2
(45) Date of Patent: Aug. 30, 2005

(54) DEODORIZED YELLOW COLORANT OF SAFFLOWER

(75) Inventors: Chiyoki Yukawa, Toyonaka (JP); Takahito Ichi, Toyonaka (JP); Kuniyoshi Onishi, Toyonaka (JP); Hiroyuki Sato, Toyonaka (JP)

(73) Assignee: San-Ei Gen F.F.I., Inc., Osaka (JP)

( * ) Notice: Subject to any disclaimer, the term of this patent is extended or adjusted under 35 U.S.C. 154(b) by 141 days.

(21) Appl. No.: 10/276,321

(22) PCT Filed: May 7, 2001

(86) PCT No.: PCT/JP01/03816

§ 371 (c)(1), (2), (4) Date: Nov. 25, 2002

(87) PCT Pub. No.: WO01/90255

PCT Pub. Date: Nov. 29, 2001

(65) Prior Publication Data

US 2003/0124236 A1 Jul. 3, 2003

(30) Foreign Application Priority Data

May 26, 2000 (JP) .................................. 2000-157475

(51) Int. Cl.⁷ ................................................. A23I 1/27
(52) U.S. Cl. ....................... 426/250; 426/540; 426/426; 426/425
(58) Field of Search ................. 426/540, 655, 426/425, 431, 487, 250

(56) References Cited

U.S. PATENT DOCUMENTS 6,180,154 B1 * 1/2001 Wrolstad et al. ............ 426/540
2003/0082281 A1 * 5/2003 Kohler et al. ............... 426/262

FOREIGN PATENT DOCUMENTS

| JP | 60-176562 A | 9/1985 |
|----|----|----|
| JP | 60-177076 A | 9/1985 |
| JP | 61-36364 A | 2/1986 |
| JP | 61097361 | * 5/1986 |
| JP | 61097362 | * 5/1986 |
| JP | 4-214767 A | 8/1992 |
| JP | 09-296124 A | 11/1997 |
| JP | 10-36701 A | 2/1998 |
| JP | 10-306224 A | 11/1998 |
| JP | 2000-290525 A | 10/2000 |

OTHER PUBLICATIONS

Database WPI Section Ch, Week 198539, Derwent Publication Ltd., London, GB; Class A87, AN 1985–239959, XP002297428 & JP 60 156761 A (Yamagata-ken), 89/16/85*Abstract*.

Database EPODOC —Online!to European Patent Office, The Hague, NL; XP002297427 & IN 183 773 a (Council Scient Ind Res), Apr. 8, 2000*Abstract*.

Patent Abstracts of Japan, vol. 012, No. 139 (C–491), Apr. 27, 1988 & JP 62 257384 A, Nov. 9, 1997*Abstract*.

* cited by examiner

Primary Examiner—N. Bhat
(74) Attorney, Agent, or Firm—Armstrong, Kratz, Quintos, Hanson & Brooks, LLP

(57) ABSTRACT

A *Carthamus* yellow colorant which has no or significantly smell originating in safflower, and a colorant formulation containing this colorant. Namely, a *Carthamus* yellow colorant which has a concentration of aroma components (acetic acid, isovaleric acid, phenylethyl alcohol, phenol, 4-vinyl phenol) contained therein of 100 ppm or less in case where the color value $E^{10}_{1\,cm}$ is 160.

16 Claims, 1 Drawing Sheet

A

B

DEODORIZED YELLOW COLORANT OF SAFFLOWER

This application is a 371 of PCT/JP01/03816 filed May 07, 2001.

TECHNICAL FIELD

The present invention relates to a yellow colorant of safflower (*Carthamus* yellow colorant) that is odorless or whose odor has been significantly reduced to just a faint odor, and to a colorant formulation containing this colorant. More particularly, the present invention relates to a *Carthamus* yellow colorant that is odorless or has just a faint odor, in which the development of an unpleasant odor over time, which can be caused by light or heat during storage, is significantly diminished, and to a colorant formulation containing this colorant. The present invention also relates to a method for preparing this odorless or low-odor *Carthamus* yellow colorant.

BACKGROUND ART

*Carthamus* yellow colorants, which are flavonoid colorants, are widely used, mainly in the coloring of beverages and other edible products. However, a *Carthamus* yellow colorant has a distinctive odor that comes from its raw material, safflower (*Carthamus tinctorius* L.), so when it is used in foods and other products, this odor can sometimes undesirably taint the flavor and taste of these foods, etc.

Consequently, there has long been a need for a *Carthamus* yellow colorant formulation that can be added to foods and so forth and an aroma component therein has been reduced to the point that the distinctive odor of safflower is undetectable, and various purification methods have been examined up to now. Methods that have been proposed for refining a *Carthamus* yellow colorant include a method in which a *Carthamus* yellow colorant aqueous solution is treated with an ion exchange resin (Japanese Patent Un-examined Publication H4-214767), a method in which a water-soluble food coloring is extracted with an organic solvent or supercritical carbon dioxide (Japanese Patent Examined Publication H4-48420), and a method in which a water-soluble natural colorant is brought into contact with an adsorption resin and subcritical or supercritical carbon dioxide (Japanese Patent Un-examined Publication H10-36701).

However, few methods have been disclosed for removing the distinctive odor of a *Carthamus* yellow colorant. A *Carthamus* yellow colorant formulation prepared by one of the above refining treatments still has a strong and distinctive odor that comes from the petals of safflower, and such a formulation cannot be considered to have solved the above problems.

Also, conventional *Carthamus* yellow colorant formulations have been indicated as having a so-called "return smell," that is, the odor gradually becomes stronger over time due to the effects of heat, light, and so forth during storage, and this problem of "return smell" has yet to be resolved with the various refining treatments discussed above.

DISCLOSURE OF THE INVENTION

It is an object of the present invention to provide a *Carthamus* yellow colorant formulation that will have little adverse effect, over an extended period, on the flavor and taste of various products, such as foods, drugs, quasi drugs, and cosmetics, and that can be added without worry to these products.

More specifically, it is a first object of the present invention to provide a *Carthamus* yellow colorant that has no odor originating in the aroma component contained in safflower (*Carthamus tinctorius* L.), or in which this odor has been significantly reduced, and to provide a colorant formulation containing this colorant. It is a second object of the present invention to provide a *Carthamus* yellow colorant with stability, undergoing little change over time such as the so-called "return smell" as a result of heat or light to which it may be exposed during long-term storage, and to provide a colorant formulation containing this colorant. It is a third object of the present invention to provide a method for preparing an odorless or low-odor *Carthamus* yellow colorant.

The inventors spent long hours investigating *Carthamus* yellow colorant formulations in an effort to solve the problems encountered in the past, whereupon they discovered that the aroma component that is the source of pungent or unpleasant odor contained in safflower can be significantly removed and an odorless or low-odor *Carthamus* yellow colorant can be prepared by the method of the present invention. They also found that a *Carthamus* yellow colorant obtained in this manner will not have any "return smell" as a result of extended storage or the influence of heat or light. These discoveries confirmed that a *Carthamus* yellow colorant formulation that is odorless or has only a faint odor and has good stability over time can be prepared by using this *Carthamus* yellow colorant as the component.

The present invention was perfected on the basis of these various findings.

Specifically, the present invention is the *Carthamus* yellow colorant given by the following (1) to (8).

(1) A *Carthamus* yellow colorant, in which the concentration of aroma component contained therein is no more than 100 ppm when the color value $E^{10\%}_{1\ cm}$ is 160.

(2) A *Carthamus* yellow colorant, in which the concentration of aroma component contained therein is no more than 75 ppm when the color value $E^{10\%}_{1\ cm}$ is 160.

(3) A *Carthamus* yellow colorant, in which the concentration of aroma component contained therein is no more than 50 ppm when the color value $E^{10\%}_{1\ cm}$ is 160.

(4) The *Carthamus* yellow colorant according to any of (1) to (3), wherein the aroma component is at least one type selected from the group consisting of acetic acid, isovaleric acid, phenylethyl alcohol, phenol, and 4-vinylphenol.

(5) A *Carthamus* yellow colorant, in which the total concentration of acetic acid and/or isovaleric acid contained therein is no more than 20 ppm when the color value $E^{10\%}_{1\ cm}$ is 160.

(6) A *Carthamus* yellow colorant, in which the total concentration of acetic acid and/or isovaleric acid contained therein is no more than 5 ppm when the color value $E^{10\%}_{1\ cm}$ is 160.

(7) The *Carthamus* yellow colorant according to (5) or (6), wherein the concentrations of phenylethyl alcohol, phenol, and 4-vinylphenol contained therein are each no more than 50 ppm when the color value $E^{10\%}_{1\ cm}$ is 160.

(8) The *Carthamus* yellow colorant according to (5) or (6), wherein the concentrations of phenylethyl alcohol, phenol, and 4-vinylphenol contained therein are each no more than 20 ppm when the color value $E^{10\%}_{1\ cm}$ is 160.

Further, the present invention relates to a colorant formulation containing the *Carthamus* yellow colorant, as described in the following (9) through (11).

(9) A yellow colorant formulation containing the *Carthamus* yellow colorant according to any of (1) to (8).

(10) The yellow colorant formulation according to (9), which is in the form of a solution.

(11) The yellow colorant formulation according to (9) or (10), wherein the *Carthamus* yellow colorant is contained in a proportion of 1 to 90 wt % per 100 wt % of the formulation.

Further, the present invention relates to a method for preparing the above-mentioned highly purified *Carthamus* yellow colorant, as described in the following (12) through (22).

(12) A method for preparing a *Carthamus* yellow colorant that is odorless or has only a faint odor, wherein an adsorption-treated *Carthamus* yellow colorant extract is subjected to at least one type of treatment selected from the group consisting of adsorption, ion exchange, pH adjustment, extraction, and membrane separation.

(13) The method for preparing a *Carthamus* yellow colorant according to (12), wherein the pH adjustment is an acid treatment using an acid utilized as a food additive.

(14) The method for preparing a *Carthamus* yellow colorant according to (12) or (13), wherein the pH adjustment is an acid treatment using at least one type of inorganic acid selected from the group consisting of sulfuric acid, hydrochloric acid, phosphoric acid, and nitric acid.

(15) The method for preparing a *Carthamus* yellow colorant according to any of (12) to (14), wherein the pH adjustment essentially consists of exposing a *Carthamus* yellow colorant extract that has undergone an adsorption treatment or any of various other treatments to a pH of 3 to 6.

(16) The method for preparing a *Carthamus* yellow colorant according to any of (12) to (15), wherein the membrane separation is at least one type of membrane treatment selected from the group consisting of membrane filtering, ultrafiltration, reverse osmosis, electrolysis, ion selective membrane treatment, and ion exchange.

(17) A method for preparing a *Carthamus* yellow colorant that is odorless or has only a faint odor, wherein an adsorption-treated *Carthamus* yellow colorant extract is subjected to membrane separation after undergoing a deproteinization treatment.

(18) The method for preparing a *Carthamus* yellow colorant according to (17), wherein the membrane separation treatment is at least one of treatment selected from reverse osmosis and ultrafiltration.

(19) The method for preparing a *Carthamus* yellow colorant according to (17) or (18), wherein the membrane separation treatment makes use of a membrane whose molecular weight cut off is from 2000 to 4000.

(20) The method for preparing a *Carthamus* yellow colorant according to any of (17) to (19), wherein the deproteinization is at least one type of treatment selected from the group consisting of ion exchange, extraction, membrane separation, and gel filtration.

(21) The method for preparing a *Carthamus* yellow colorant according to (20), wherein the membrane separation performed as the deproteinization treatment makes use of a membrane whose molecular weight cut off is from $10^4$ to $10^6$.

(22) The method for preparing a *Carthamus* yellow colorant according to any of (17) to (21), wherein pH adjustment is performed prior to the membrane separation.

BRIEF DESCRIPTION OF THE DRAWINGS

In FIG. 1B, 1 is the peak for acetic acid, 2 is the peak for isovaleric acid, 3 is the peak for phenylethyl alcohol, and 4 is the peak for 4-vinylphenol. The peak at IS is for 2,6-di-tert-butyl-4-methylphenol (BHT), which was used as an internal standard substance. In the graphs, the vertical axis is the abundance, and the horizontal axis is the retention time.

BEST MODE FOR CARRYING OUT THE INVENTION

Figure 1:
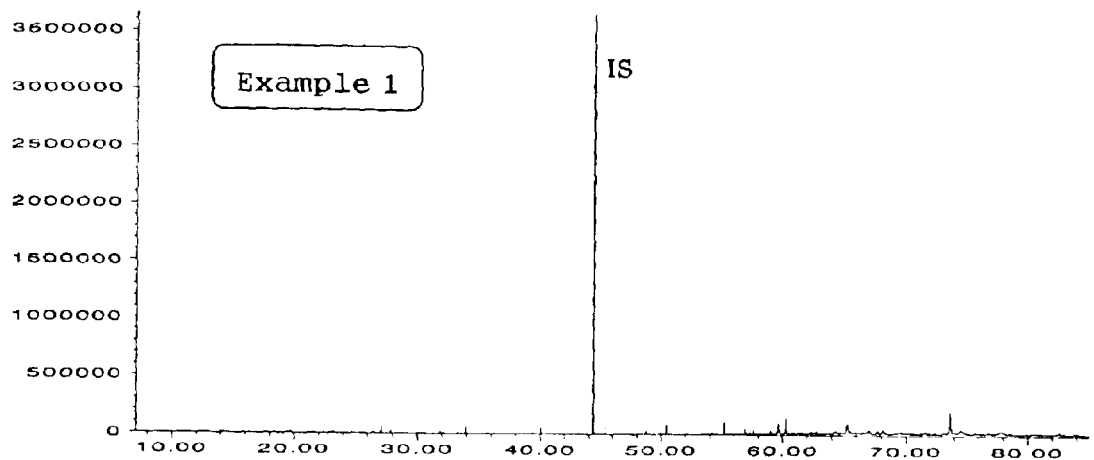
FIG. 1 is a graph of the results of measuring by gas chromatography-mass spectrometer (GC-MS) the amount of aroma component contained in the *Carthamus* yellow colorant formulation prepared in Example 1 (FIG. 1A) and in the *Carthamus* yellow colorant formulation prepared in Comparative Example 1 (FIG. 1B).
Figure 1:
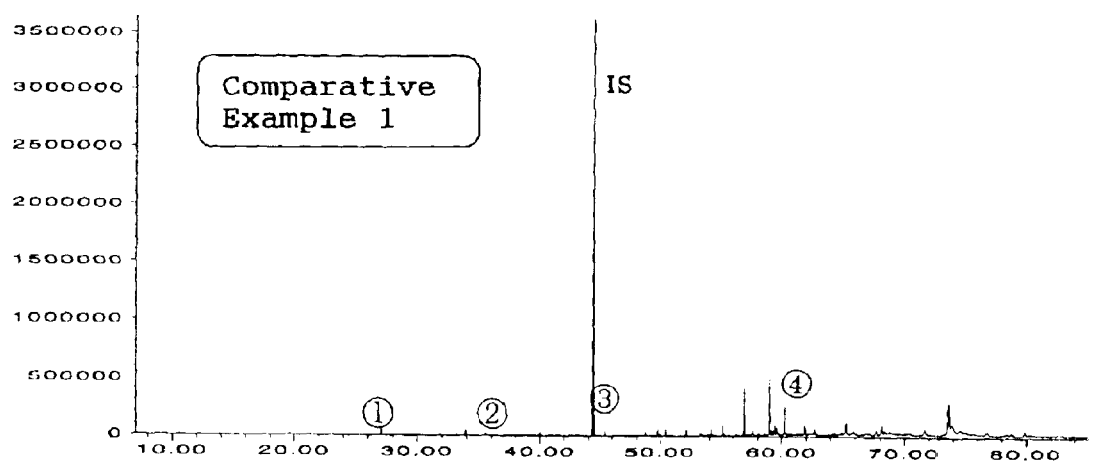

The present invention is an odorless or low-odor *Carthamus* yellow colorant in which either there is none of the odor originating in the safflower used as a raw material, or this odor has been significantly reduced.

In the present invention, "*Carthamus* yellow colorant" refers to a flavonoid colorant whose main component is safflomin (*carthamus* yellow), which is obtained from safflower (*Carthamus tinctorius*), a plant of the composite family, and particularly from the petals thereof.

"Color value" ($E^{10\%}_{1\ cm}$) as used in the present invention is a numerical value obtained by measuring the absorbency (measurement cell width: 1 cm) at the maximum absorption wavelength (near 402 nm) for the visible portion of a solution (buffer pH 5) containing the *Carthamus* yellow colorant in question, and converting this absorbency into the absorbency of a solution containing 10 w/v % *Carthamus* yellow colorant.

The term "aroma component" as used in the present invention means the volatile aroma component originating in safflower and more particularly in the petals thereof, which is the source of the pungent or unpleasant odor, and while there are no particular restrictions on this component, examples include acetic acid, isovaleric acid, phenylethyl alcohol, phenol, and 4-vinylphenol.

The *Carthamus* yellow colorant of the present invention is characterized in that the total concentration of the above-mentioned aroma component contained in the colorant is no more than 100 ppm when the color value of the colorant is adjusted such that $E^{10\%}_{1\ cm}=160$. Preferably, this concentration is about 75 ppm or less, with about 50 ppm or less being better yet, and about 20 ppm or less being particularly favorable. The concentrations of the aroma component are substantially proportional to the color values. Thus, as long as the total concentration of the aroma component in the *Carthamus* yellow colorant of the present invention is within the above range when the color value has been adjusted as above, the colorant itself does not need to have the above-mentioned color value.

It is preferable if the *Carthamus* yellow colorant of the present invention is such that the total concentration of acetic acid and/or isovaleric acid contained in the colorant is about 20 ppm or less, and preferably about 5 ppm or less, when the color value is adjusted to the above value. These components have an extremely low odor threshold and give off an odor when contained in even a tiny amount, and are therefore volatile aroma components originating in safflower that become a source of unpleasant odor. In this case, it is preferable if the concentrations of the various other aroma components mentioned above (phenylethyl alcohol, phenol, and 4-vinylphenol) contained in the *Carthamus* yellow colorant are each about 50 ppm or less, and preferably about 20 ppm or less.

The *Carthamus* yellow colorant of the present invention, that has been rendered odorless or had its odor reduced by this major reduction in the content of the aroma component can be prepared by subjecting an adsorption-treated *Carthamus* yellow colorant extract to at least one type of treatment (in any combination desired) selected from the group consisting of adsorption, ion exchange, pH adjustment, extraction, and membrane separation.

Therefore, the present invention provides a method for preparing the above-mentioned odorless or low-odor *Carthamus* yellow colorant (deodorized *Carthamus* yellow colorant). Looked at another way, this preparing method of the present invention can also be called a method for purification of a *Carthamus* yellow colorant that is useful in removing or reducing the amount of aroma components that cause a pungent or unpleasant odor, and particularly the above-mentioned acetic acid, isovaleric acid, phenylethyl alcohol, phenol, and 4-vinylphenol, contained in a safflower colorant extract. Viewed from yet another angle, the preparing method of the present invention can also be called a method for deodorizing a *Carthamus* yellow colorant.

A solvent extract of the safflower plant discussed above is used as the "*Carthamus* yellow colorant extract" used in the preparing method of the present invention. The portion of the plant used in the extraction should be the portion containing the targeted colorant, and particularly *Carthamus* yellow colorant, with no particular distinction being made between the entire plant and a portion thereof (such as the petals or buds). The petal portion is preferred. All or part of this plant may be subjected to an extraction operation just as it is (raw) or after being crushed (coarsely powdered, finely chopped, etc.), or it may be subjected to an extraction operation after being dried and, if needed, crushed (powdered, etc.).

There are no particular restrictions on the solvent used in the above extraction, as long as it is able to extract the safflomin contained in the safflower. An alcohol, water, or a mixture of these can be used favorably. Examples of alcohols include methanol, ethanol, propanol, isopropyl alcohol, butanol, and other $C_1$ to $C_4$ lower alcohols. Water or water containing an alcohol (a hydrous alcohol) is preferred.

Any commonly used extraction method can be employed, with no restrictions thereon, but examples include a method in which all or part of the safflower (as picked, or after being coarsely powdered or finely chopped), or a dried product thereof (including one produced by dry pulverization (such as a powder)) is cold dipped, hot dipped, or otherwise immersed in a solvent, a method in which extraction is performed under heating and stirring and an extract is obtained by filtration, and a percolation process.

The obtained extract is filtered, coprecipitated, or centrifuged as needed to remove the solids, after which this product is subjected to an adsorption treatment, either directly or after being concentrated.

The adsorption treatment can be performed by a standard method, such as adsorption using activated carbon, silica gel, or porous ceramic; or adsorption using a synthetic adsorption resin, such as styrene-based Duolite S-861 (trademark of Duolite, U.S.A., Diamond Shamrock; the same applies below), Duolite S-862, Duolite S-863, and Duolite S-866: aromatic Sepabeads SP70 (trademark of Mitsubishi Chemical; the same applies below), Sepabeads SP700, and Sepabeads SP825: Diaion HP10 (trademark of Mitsubishi Chemical; the same applies below), Diaion HP20, Diaion HP21, Diaion HP40, and Diaion HP50: or Amberlite XAD-4 (trademark of Organo; the same applies below), Amberlite XAD-7, and Amberlite XAD-2000.

The adsorption-treated extract used in the preparing method of the present invention can be obtained by using a hydrous alcohol or other suitable solvent to wash the resin carrier to which the *Carthamus* yellow colorant extract has been applied and its colorant component adsorbed, and thereby recover the desired extract. Water containing 10 to 60 vol % ethanol can usually be used to advantage as the hydrous alcohol here.

The adsorption-treated *Carthamus* yellow colorant extract thus obtained is then subjected to any of various treatments, such as another adsorption treatment, ion exchange, pH adjustment, extraction, or membrane separation.

Examples of adsorption treatments here are the same as those listed above.

There are no particular restrictions on the ion exchange treatment, which can be performed by a standard method using an ordinary ion exchange resin (cation exchange resin or anion exchange resin). For instance, examples of cation exchange resins include Diaion SK1B (trademark of Mitsubishi Chemical; the same applies below), Diaion SK102, Diaion SK116, Diaion PK208, Diaion WK10, and Diaion WK20, and examples of anion exchange resins include Diaion SA10A (trademark of Mitsubishi Chemical; the same applies below), Diaion SA12A, Diaion SA20A, Diaion PA306, Diaion WA10, and Diaion WA20, although other products may be used instead.

The "pH adjustment" referred to in the present invention can be accomplished by adjusting a *Carthamus* yellow colorant extract that has undergone an adsorption treatment or any of various other treatments (adsorption, ion exchange, pH adjustment, extraction, or membrane separation) to a pH of 1 to 8, and exposing this extract to acidic to neutral conditions. Preferably, the pH adjustment is an acid treatment in which the above-mentioned treated extract is exposed to a pH of 3 to 6. The acid treatment can be performed easily by adding an acid to the above-mentioned treated extract. There are no particular restrictions on this acid, as long as it is one ordinarily used as a food additive, and any such acid can be selected as desired. For example, organic acids such as citric acid, acetic acid, malic acid, and lactic acid, or inorganic acids such as sulfuric acid, hydrochloric acid, phosphoric acid, and nitric acid may be used. Preferably, an inorganic acid normally used as a food additive will be used in the acid treatment.

There are no particular restrictions on the temperature at which the pH adjustment is performed, and usually any temperature can be selected as needed from a range of 5 to 100° C. Examples include a range of 20 to 100° C. or 40 to 100° C. There are no particular restrictions on the duration of the pH adjustment, either, which usually can be selected as needed from a range of 1 to 300 minutes. A short treatment time is generally sufficient if the treatment is carried out at a high temperature, and thus if the temperature is from 40 to 100° C., the treatment time can be from 5 to 60 minutes. The treated extract may or may not be stirred during this time.

There are no particular restrictions on the extraction treatment in the present invention, but an example is a method in which a *Carthamus* yellow colorant extract that has undergone an adsorption treatment or any of various other treatments (adsorption, ion exchange, pH adjustment, extraction, or membrane separation) is brought into contact with carbon dioxide gas or with a liquid such as ethylene or propane inside a sealed apparatus at a pressure and temperature over the critical point.

"Membrane separation" as used in the present invention encompasses a broad range of filtration by membrane, examples of which include filtration treatments that make use of a membrane filter (MF), ultrafiltration (UF) membrane, reverse osmosis membrane (NF), electrolysis membrane, or other such functional macromolecular membrane. In addition to ultrafiltration, reverse osmosis, and other such methods that utilize these membranes, known membrane separation methods include dialysis utilizing a concentration gradient produced by an ion selective membrane, and electrolysis in which an ion exchange membrane is used as a diaphragm and a voltage is applied thereto. For industrial purposes, a membrane separation method that makes use of a reverse osmosis membrane is preferable. The membrane material used in this membrane separation can be either natural, synthetic, or semi-synthetic, and examples include cellulose, cellulose diacetate or triacetate, polyamide, polysulfone, polystyrene, polyimide, and polyacrylonitrile.

The membrane separation method used in the present invention includes a method in which high-molecular weight compounds are separated out with a membrane whose molecular weight cut off is between $10^4$ and $10^6$, for example, and a method in which low-molecular weight compounds are separated out using a membrane with a molecular weight cut off of about 2000 to 4000, and preferably about 3000. Specific examples of the former method include ultrafiltration (UF) membrane treatments that make use of an NTU-3150 membrane, NTU-3250 membrane, NTU-3550 membrane, or NTU-3880 membrane (all made by Nitto Denko); Cefilt-UF (made by NGK Insulators); and an AHP-2013 membrane, AHP-3013 membrane, or AHP-1010 membrane (all made by Asahi Chemical). Specific examples of the latter method include reverse osmosis membrane (molecular weight cut off of about 3000) treatments that make use of an NTR-7250 membrane, NTR-7410 membrane, NTR-7430 membrane, or NTR-7450 membrane (all made by Nitto Denko); or an AIP-3013 membrane, ACP-3013 membrane, ACP-2013 membrane, AIP-2013 membrane, or AIO-1010 membrane (all made by Asahi Chemical).

These various treatments may be performed alone or in any combination of two or more. Also, the same treatment may be performed more than once, under the same or different conditions.

There are no particular restrictions on the preferred treatment method, but one example is a method in which an adsorption-treated *Carthamus* yellow colorant extract is deproteinized, and this product is then subjected to membrane separation.

The deproteinization treatment can be performed most effectively by the above-mentioned extraction treatment, ion exchange treatment, or membrane separation treatment utilizing an ultrafiltration membrane or the like. Furthermore, a treatment that makes use of the membrane whose molecular weight cut off is approximately $10^4$ to $10^6$, used in the separation and removal of the high-molecular weight compounds, can be favorably employed for the membrane separation treatment in this case. The deproteinization treatment, though, is not limited to these methods, and can be accomplished by gel filtration or any other standard deproteinization treatment.

If needed, another adsorption treatment can also be performed after the above-mentioned deproteinization treatment. An example of a favorable treatment method is to subject the colorant extract that has undergone deproteinization to an adsorption treatment as necessary, then perform pH adjustment, and preferably an acid treatment, and finally subject the treated colorant extract thus obtained to membrane separation. The membrane separation treatment here is preferably reverse osmosis or ultrafiltration, with treatment by a reverse osmosis membrane being particularly favorable. This membrane separation is preferably performed using a membrane whose molecular weight cut off is 2000 to 4000, and preferably close to 3000.

The aroma component originating in the safflower, which is the source of the pungent or unpleasant odor, has been effectively removed from the *Carthamus* yellow colorant of the present invention obtained as above, so the present invention provides a *Carthamus* yellow colorant that is either odorless or has only a faint odor, with the odor having been reduced to the extent that the addition of the colorant to a foodstuff will have little adverse effect on the flavor thereof. Also, the *Carthamus* yellow colorant of the present invention obtained by the above method undergoes little change over time, known as the "return smell," whereby the influence of heat or light during long-term storage brings out an odor. The reason for this is believed to be that the precursor of the aroma component capable of giving off a pungent or unpleasant odor is decomposed or removed by the above preparing method of the present invention, although this theory has not been proven.

A colorant formulation can be prepared in the form of a solution by dissolving or dispersing (emulsifying) the *Carthamus* yellow colorant of the present invention in water, an alcohol such as ethanol or propylene glycol, or another solvent, or a powder, granules, tablets, pills, or the like can be prepared by using dextrin or the like as an excipient. A solution form is preferred.

Therefore, the present invention also provides a yellow colorant formulation containing the above-mentioned *Carthamus* yellow colorant.

This colorant formulation may be composed of just the *Carthamus* yellow colorant of the present invention, or carriers and various additives that can be used in foods may also be contained in addition to the above-mentioned *Carthamus* yellow colorant.

Specific examples of these carriers and additives include dextrin, lactose, and powdered syrup, as well as preservatives (such as sodium acetate and protamine), stabilizers (such as sodium phosphate and sodium metaphosphate), antioxidants (such as rutin and ascorbic acid), and other such food additives normally used with colorants and colorant formulations.

When the colorant formulation of the present invention contains any of various carriers, additives, and so forth, there are no particular restrictions on the proportion in which the above-mentioned *Carthamus* yellow colorant is contained in the colorant formulation, but the amount is usually from 1 to 90 wt %, and preferably from 10 to 80 wt %.

The colorant formulation of the present invention is useful as a yellow color in foods, drugs, quasi drugs, cosmetics, feed, and so forth, and particularly as a natural color.

There are no particular restrictions on the food to which the colorant formulation of the present invention can be applied, as long as it is dyed, or has coloring, but examples include ice cream, ice milk, lacto-ice, sherbet, ice candy, and other such frozen concoctions; milk beverages, lactobacillus beverages, fruit juice-containing soft drinks, carbonated beverages, fruit juice beverages, powdered beverages, and other such beverages; custard pudding, milk pudding, fruit juice-containing pudding, and other such puddings; jellies, Bavarian cream, yogurt, and other such desserts; chewing gum, bubble gum, and other such gums (stick gum and sugar-coated gum granules); marble chocolate and other such coated chocolates, as well as strawberry chocolate, blueberry chocolate, melon chocolate, and other flavored chocolates, and other such chocolates; hard candy (including bon bons, butterballs, and marbles), soft candy (including caramel, nougat, gummy candy, and marshmallow), drops, taffy, and other such candies; hard biscuits, cookies, okaki (sliced and dried glutinous rice), senbei (sliced and dried non-glutinous rice), and other such baked snacks; asazuke (fresh vegetables preserved with salt or malt), soy sauce pickles, salt pickles, miso pickles, kasuzuke (rice bran pickles), malt pickles, sugar pickles, vinegar pickles, mustard pickles, moromizuke (unrefined sake pickles), plum pickles, fukujinzuke (sliced vegetables pickled in soy sauce and dyed red), shibazuke (assorted vegetables hashed and pickled in salt), ginger pickles, kimchee, plum vinegar pickles, and other such pickles; vinaigrette dressings, non-oil dressings, ketchup, gravy, Worcester sauce, pork cutlet sauce, and other such sauces; strawberry jam, blueberry jam, marmalade, apple jam, apricot jam, preserves, and other such jams; red wine and other such fruit wines; candied cherries, apricots, applies, strawberries, and other such processed fruits; ham, sausage, roast pork, and other such processed meats; fish meat ham, fish meat sausage, ground fish meat, boiled fish paste, chikuwa (tubular fish cakes), hanpen (a cake of pounded fish), satsumaage (fried fish cakes), datemaki (rolled omelets), whale bacon, and other ground marine products; udon noodles, hiyamugi (cold soba noodles), soumen (vermicelli), soba (hot soba noodles), Chinese soba noodles, spaghetti, macaroni, bifun noodles, harusame noodles, won ton, and other such pastas; as well as various types of side dishes and processed food such as boiled fish paste, wheat gluten bread, and denbu (mashed and seasoned fish).

Coloring in foodstuffs encompasses not only artificial coloring by adding a colorant to a food, but also a wide range of coloring through the use of colorants already contained in the materials of the food, such as fruit juices.

In drugs, [the present invention] can be used, for example, as a color for various kinds of tablets, capsules, drinkable preparations, lozenges, gargles, and so forth; in quasi drugs, as a color for dentifrice, breath fresheners, mouthwashes, and so forth; in cosmetics, as a color for skin lotions, lipsticks, sun blocks, makeup, and so forth; and it can be used in feeds, such as cat food, dog food, fish food, and other such pet food, as aquaculture feed, and so forth.

The present invention encompasses the following aspects.

(a) A method for purification of a *Carthamus* yellow colorant, characterized in that an adsorption-treated *Carthamus* yellow colorant extract is subjected to at least one type of treatment selected from the group consisting of adsorption, ion exchange, pH adjustment, extraction, and membrane separation.

(b) A method for purification of a *Carthamus* yellow colorant, characterized in that an adsorption-treated *Carthamus* yellow colorant extract is subjected to membrane separation after undergoing a deproteinization treatment.

(c) The method for purification of a *Carthamus* yellow colorant according to (b) above, wherein the deproteinization is at least one type of treatment selected from the group consisting of ion exchange, extraction, membrane separation, and gel filtration.

(d) The method for purification of a *Carthamus* yellow colorant according to (b) above, wherein the pH adjustment is performed prior to the membrane separation.

(e) A method for deodorizing a *Carthamus* yellow colorant, characterized in that an adsorption-treated *Carthamus* yellow colorant extract is subjected to at least one type of treatment selected from the group consisting of adsorption, ion exchange, pH adjustment, extraction, and membrane separation.

(f) A method for deodorizing a *Carthamus* yellow colorant, characterized in that an adsorption-treated *Carthamus* yellow colorant extract is subjected to membrane separation after undergoing a deproteinization treatment.

(g) The method for deodorizing a *Carthamus* yellow colorant according to (f) above, wherein the deproteinization is at least one type of treatment selected from the group consisting of ion exchange, extraction, membrane separation, and gel filtration.

(h) The method for deodorizing a *Carthamus* yellow colorant according to (f) above, wherein pH adjustment is performed prior to the membrane separation.

(i) An use of a *Carthamus* yellow colorant as a food color, in which the concentration of an aroma component contained therein is no more than 100 ppm when the color value $E^{10\%}_{1\,cm}$ is 160.

(j) The use of the *Carthamus* yellow colorant as a food color according to (i) above, in which the aroma component is at least one type selected from the group consisting of acetic acid, isovaleric acid, phenylethyl alcohol, phenol, and 4-vinylphenol.

(k) An use of a *Carthamus* yellow colorant as a food color, in which the total concentration of acetic acid and/or isovaleric acid contained therein is no more than 20 ppm when the color value $E^{10\%}_{1\,cm}$ is 160.

(l) An use of a *Carthamus* yellow colorant as a food color, in which the total concentration of acetic acid and/or isovaleric acid contained therein is no more than 20 ppm and the concentrations of phenylethyl alcohol, phenol, and 4-vinylphenol contained therein are each no more than 50 ppm when the color value $E^{10\%}_{1\,cm}$ is 160.

EXAMPLES

The present invention will now be described in detail through examples and comparative examples, but the present invention is not limited in any way by these examples.

Comparative Example 1

10 kg of safflower petals were soaked in 200 L of water and allowed to stand overnight at room temperature to extract the colorant. This extract was suction-filtered using a filtration auxiliary and diatomaceous earth, which yielded approximately 195 L of *Carthamus* yellow colorant extract as the filtrate. The colorant component was adsorbed from this extract with Amberlite XAD-7 (trademark of Organo), a synthetic adsorption resin (amount of resin: 30 L, SV=1), and this resin was thoroughly washed with 5 L of water, after which the colorant was eluted out with a 30% ethanol aqueous solution, and this eluate was obtained as an adsorption-treated *Carthamus* yellow colorant extract (100 L: a primary purified colorant extract). This adsorption-treated extract was concentrated under reduced pressure to obtain 5 kg of colorant extract whose color value $E^{10\%}_{1\,cm}$ was 320. 2 kg of water and 3 kg of ethanol were added to this 5 kg of colorant extract to prepare 10 kg of a *Carthamus*yellow colorant formulation whose color value $E^{10\%}_{1\,cm}$ was 160 (comparative product). When sniffed, this formulation had the pungent odor characteristic of safflower petals.

Example 1

*Carthamus* Yellow Colorant Formulation (Solution)

100 L of a primary-refined colorant extract (adsorption-treated *Carthamus* yellow colorant extract) obtained by the same method as in Comparative Example 1 was again treated with a synthetic adsorption resin (Amberlite XAD-2000, trademark of Organo; amount of resin: 5 L, SV=10), and the portion that passed through the resin was obtained as a colorant solution (adsorption treatment). This colorant solution was treated at 20° C. and 3.5 kg/cm² using an ultrafiltration membrane (trademark: AHP-2013 Membrane, made by Asahi Chemical, molecular weight cut off: 50,000) (membrane separation treatment). The treated extract thus obtained was then adjusted to a pH of 2.0 with sulfuric acid, the product of which was stirred for 30 minutes at a temperature of 40 to 80° C. (pH adjustment treatment).

80 L of water was then added to this acidic solution to perform a reverse osmosis treatment (trademark: NTR-7250 Membrane, made by Nitto Denko, molecular weight cut off: about 3000), which gave 10 L of membrane-treated extract (membrane separation treatment). The aroma component and impurities in the safflower were removed as filtrate here, and the purified and deodorized colorant component was concentrated as the residue. This residue was concentrated under reduced pressure to obtain 4.5 kg of colorant extract that had been significantly deodorized and purified and had a color value $E^{10\%}_{1\ cm}$ of 320. 1.8 kg of water and 2.7 kg of ethanol were added to 4.5 kg of this colorant extract to prepare 9 kg of a *Carthamus* yellow colorant formulation whose color value $E^{10\%}_{1\ cm}$ was 160 (product of the present invention).

Example 2

*Carthamus* Yellow Colorant Formulation (Solid)

6.0 kg of water and 1.5 kg of dextrin were added to 3.2 kg of a colorant extract that had been significantly deodorized and purified and had a color value $E^{10\%}_{1\ cm}$ of 320, which had been prepared by the same method as in Example 1. This product was spray-dried to prepare 2.5 kg of a *Carthamus* yellow colorant powder formulation whose color value $E^{10\%}_{1\ cm}$ was 400. This formulation had no odor.

Example 3

GC-MS Measurement

The amounts of aroma component contained in the *Carthamus* yellow colorant formulation prepared in Comparative Example 1 (comparative product) and the *Carthamus* yellow colorant formulation prepared in Example 1 (present invention product) were measured with a gas chromatography-mass spectrometer (GC-MS) and compared. Specifically, 5 g of each colorant formulation (color value $E^{10\%}_{1\ cm}$=160) was extracted with 200 mL of diethyl ether containing 3 ppm an internal standard substance (IS: 2,6-di-tert-butyl-4-methylphenol (BHT)). This diethyl ether solution was then dried by evaporation, and the concentrate thus obtained was put in a gas chromatography-mass spectrometer (GC-MS) to measure the amount of aroma component.

| GC-MS measurement conditions | |
|---|---|
| GC/MS: | Hewlett-Packard 5973 Mass Selective Detector |
| Column: | DB-WAX made by J&W (0.25 mm × 60 m) |
| Temperature: | inlet 250° C., interface 230° C., column temperature 50° C. (2 min.) –220° C., elevation rate 3° C./min. |
| Split ratio: | 70:1 |
| Ionization electrode: | 70 eV |

The results are shown in FIG. 1. As indicated in FIG. 1A, the total ion chromatogram of the *Carthamus* yellow colorant formulation of Example 1 (present invention product) indicated that the aroma component other than the internal standard substance accounted for only a tiny amount (73 ppm or less). In contrast, as shown in FIG. 1B, many volatile aroma components were found to be contained (215 ppm) in the *Carthamus* yellow colorant formulation of Comparative Example 1 (comparative product). These results were in agreement with the above-mentioned fact that the colorant formulation of Comparative Example 1 had the odor characteristic of safflower petals, whereas the colorant formulation of Example 1 was odorless.

In FIG. 1B, $\hat{1}$ is the peak for acetic acid, $\hat{2}$ is the peak for isovaleric acid, $\hat{3}$ is the peak for phenylethyl alcohol, $\hat{4}$ is the peak for 4-vinylphenol, and IS is the peak for BHT, which was used as the internal standard substance.

Example 4

Flavor Evaluation and Storage Test

The *Carthamus* yellow colorant formulation of Comparative Example 1 (comparative product) and the *Carthamus* yellow colorant formulation of Example 1 (present invention product) were evaluated for their flavor immediately after preparation, and their flavor after storage for between 15 and 30 days at 5° C., 25° C., or 38° C., by a panel of ten well-trained flavorists. Also, a beverage-type solution (color value $E^{10\%}_{1\ cm}$=0.04, Brix. 10°, 0.2 citric acid aqueous solution, no flavoring added) was prepared using each of the colorant formulation, and the aroma of each solution immediately after preparation and after storage was comparatively evaluated in the same manner as above, the results of which are given in Table 1.

TABLE 1

| | | | Immediately after preparation | After being stored 15 days | After being stored 30 days |
|---|---|---|---|---|---|
| C. E. 1 | Formulation | 5° C. | C | C | D |
| | | 25° C. | C | D | E |
| | | 38° C. | C | E | E |
| | Beverage | 5° C. | B | B | B |
| | | 25° C. | B | C | C |
| | | 38° C. | B | D | D |
| Ex. 1 | Formulation | 5° C. | A | A | A |
| | | 25° C. | A | A | A |
| | | 38° C. | A | A | A |
| | Beverage | 5° C. | A | A | A |
| | | 25° C. | A | A | A |
| | | 38° C. | A | A | A |

C. E.: Comparative Example
Evaluation criteria:
A: no odor perceived whatsoever
B: very slight odor
C: has odor
D: strong odor
E: extremely strong odor As can be seen from the results for immediately after preparation in Table 1, the odor of the product of the present invention was significantly reduced as compared to that of the comparative product, and the former was deemed to be a substantially odorless colorant. Furthermore, the flavor of the comparative product grew steadily stronger as the storage duration lengthened from 15 to 30 days, whereas the present invention product underwent little change over time, and remained in the same odorless state as immediately after its preparation. This suggests not only that the *Carthamus* yellow colorant of the present invention, prepared by the method in Example 1, does not itself contain any aroma components that give off an odor, or contains almost none, but also that no impurities that would be precursors of these aroma components are contained, either.

INDUSTRIAL APPLICABILITY

The *Carthamus* yellow colorant of the present invention is highly purified, and as a result, either has none of the unpleasant or pungent odor that comes from the aroma components contained in the safflower used as a raw material, and particularly in the petals thereof, or has had this odor significantly reduced to the point of being an odorless or low-odor colorant. Furthermore, the change over time (such as return smell) in the *Carthamus* yellow colorant caused by the influence of heat or light during long-term storage is significantly reduced. Accordingly, when the colorant of the present invention, or a colorant formulation containing said colorant, is used to color a beverage or other foodstuff, a drug, a cosmetic, feed, or the like, the product will be unaffected by the smell of the aroma component characteristic of a *Carthamus* yellow colorant, allowing a product with a better flavor to be manufactured.

What is claimed is:

1. A method for preparing a *Carthamus* yellow colorant that is odorless or has only a faint odor, wherein an adsorption-treated *Carthamus* yellow colorant extract is subjected to a combination of an acid treatment at a high temperature and at least one treatment selected from the group consisting of adsorption, ion exchange, extraction and membrane separation.

2. The method for preparing a *Carthamus* yellow colorant according to claim 1, wherein the acid treatment involves the use of an acid utilized as a food additive.

3. The method for preparing a *Carthamus* yellow colorant according to claim 1, wherein the acid treatment involves the use of at least one inorganic acid selected from the group consisting of sulfuric acid, hydrochloric acid, phosphoric acid, and nitric acid.

4. The method for preparing a *Carthamus* yellow colorant according to claim 1, wherein the acid treatment essentially consists of exposing a *Carthamus* yellow colorant extract that has undergone an adsorption treatment or any of various other treatments to a pH of 3 to 6.

5. The method for preparing a *Carthamus* yellow colorant according to claim 1, wherein the adsorption-treated *Carthamus* yellow colorant extract is subjected to the membrane separation, and the membrane separation is at least one treatment selected from the group consisting of membrane filtering, ultrafiltration, reverse osmosis, electrolysis, and ion exchange.

6. A method for preparing a *Carthamus* yellow colorant that is odorless or has only a faint odor, wherein an adsorption-treated *Carthamus* yellow colorant extract is subjected to a deproteinization treatment, an acid treatment, and a membrane separation.

7. The method for preparing a *Carthamus* yellow colorant according to claim 6, wherein the membrane separation is at least one treatment selected from reverse osmosis and ultrafiltration.

8. The method for preparing a *Carthamus* yellow colorant according to claim 6, wherein the membrane separation treatment makes use of a membrane whose molecular weight cut off is from 2000 to 4000.

9. The method for preparing a *Carthamus* yellow colorant according to claim 6, wherein the deproteinization treatment is at least one treatment selected from the group consisting of ion exchange, extraction, membrane separation, and gel filtration.

10. The method for preparing a *Carthamus* yellow colorant according to claim 9, wherein the membrane separation performed as the deproteinization treatment makes use of a membrane whose molecular weight cut off is from $10^4$ to $10^6$.

11. The method for preparing a *Carthamus* yellow colorant according to claim 6, wherein the acid treatment is carried out at a high temperature.

12. The method for preparing a *Carthamus* yellow colorant according to claim 11, wherein the membrane separation is at least one treatment selected from reverse osmosis and ultrafiltration.

13. The method for preparing a *Carthamus* yellow colorant according to claim 11, wherein the membrane separation makes use of a membrane whose molecular weight cut off is from 2000 to 4000.

14. The method for preparing a *Carthamus* yellow colorant according to claim 11, wherein the deproteinization treatment is at least one treatment selected from the group consisting of ion exchange, extraction, membrane separation, and gel filtration.

15. The method for preparing a *Carthamus* yellow colorant according to claim 11, wherein the membrane separation performed as the deproteinization treatment makes use of a membrane whose molecular weight cut off is from $10^4$ to $10^6$.

16. A method for preparing a *Carthamus* yellow colorant that is odorless or has only a faint order according to claim 6, wherein an additional adsorption treatment is conducted between the deproteinization treatment and the acid treatment.

* * * * *